G. F. ROYER & L. F. ZWEIBEL.
PACKING FOR PISTON RODS.
APPLICATION FILED JULY 10, 1907.
977,477.
Patented Dec. 6, 1910.
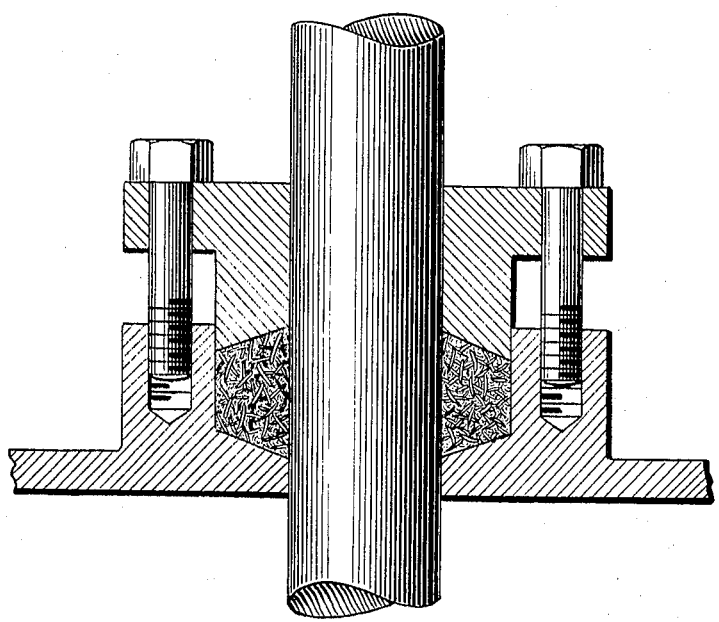

UNITED STATES PATENT OFFICE.

GEORGE F. ROYER AND LEWIS F. ZWEIBEL, OF WILKES-BARRE, PENNSYLVANIA.

PACKING FOR PISTON-RODS.

977,477.  Specification of Letters Patent.  Patented Dec. 6, 1910.

Application filed July 10, 1907. Serial No. 383,093.

*To all whom it may concern:*

Be it known that we, GEORGE F. ROYER and LEWIS F. ZWEIBEL, citizens of the United States, and residents of Wilkes-Barre, Luzerne county, State of Pennsylvania, have invented certain new and useful Improvements in Packing for Piston-Rods, &c., of which the following is a specification.

The present invention relates to improvements in packings for piston rods, etc., and has for its object to provide a packing which may be used in any stuffing box adapted to receive soft packing without requiring the use of springs or other means to hold it in proper position and which will possess sufficient elasticity to compensate for the wear of the parts from use.

In the accompanying drawing there is illustrated, conventionally, a stuffing box of ordinary character having therein a body of packing make in accordance with the present invention.

The improved packing is composed of soft metal flakes, asbestos fiber or fuzz and flake graphite.

The proportions of the several materials composing the packing may be varied in accordance with the particular use for which the packing is to be employed. For general use it is preferred to combine the materials in the following proportions: flake metal 90%, asbestos fiber or fuzz 6%, flake graphite 4%.

Experience has shown that for use with piston rods where the pressure of steam or air is not constant, the best results are obtained when the proportion of metal is increased and that of asbestos decreased. Where a continuous or constant pressure is experienced, the best results are obtained, when the proportion of asbestos is increased and thereby the packing is made more dense.

The metal employed in the packing is as before stated of flake form, being preferably cast in thin flakes and the asbestos fiber or fuzz acts to bind such flakes together and give the packing the desired density without crushing the metal flakes, by excessive pressure on the gland which holds the packing in place in the stuffing box.

It will be understood that the packing is to be inserted in the stuffing box in the same manner as the soft fibrous packing commonly employed and it will be sufficiently elastic to maintain itself in proper position without requiring the use of springs or other following means. While affording a sufficiently dense packing the metal flakes are not undesirably compacted into a solid mass but each is left relatively free so that there will be a proper surface adjacent the moving parts. The graphite acts to prevent corrosion of the metal flakes.

While as before stated the packing is particularly adapted for use with piston rods, it may be advantageously employed in other connections and in fact for any form of valve or similar device where it is desired to effect the closing of a passage against air or steam.

We are aware that it has been heretofore proposed to employ a loose mass or body of fibrous mineral as the medium for conducting lubricant to a surface requiring lubrication, as for instance in car axle boxes or journal bearings; and also to employ for the same purpose a mixture of cotton waste and metal particles. All of such so called "packings" however are radically different from this invention, the primary purpose of which is to prevent the passage of fluid even under pressure through a stuffing box.

As hereinbefore pointed out the packing herein described is superior to packings heretofore employed or proposed for use in the same relations, or under the same conditions that it is subjected to. It can be readily applied to any stuffing box, whereas the packings for similar use heretofore suggested or used have been specially molded or otherwise constructed so that they were only adapted for use with stuffing boxes of some particular shape and size. The soft metal flakes when compressed by a gland or nut interlock one with the other and act to make a perfect seal about a valve stem or movable part of machinery. The asbestos fiber increases the density of the packing and prevents the percolation of fluid therethrough, while the graphite prevents corrosion and preserves the packing in proper condition indefinitely.

Having thus described the invention what is claimed and desired to be secured by Letters-Patent is,

1. The herein described packing, for preventing the escape of fluid under pressure around piston rods, valve stems or moving parts of machinery, consisting of a loose fibrous mass of asbestos fiber and soft metal flakes, which can be readily packed into any stuffing box or joint.

2. The herein described packing, for preventing the escape of fluid under pressure around piston rods, valve stems or moving parts of machinery, consisting of a non-molded mass of asbestos fiber, soft metal flakes and graphite.

3. The herein described packing, for preventing the escape of fluid under pressure around piston rods, valve stems or moving parts of machinery, consisting of flake metal, asbestos fiber and graphite mixed in such proportion that the fiber constitutes about 6% of the total mass, which is loose, non-plastic and adapted to be packed into any stuffing box or joint.

In testimony whereof we affix our signatures in presence of two witnesses.

GEORGE F. ROYER.
LEWIS F. ZWEIBEL.

Witnesses:
EDWARD N. NOLL,
JOHN J. O'DONNELL.